United States Patent [19]

Lochridge et al.

[11] 3,756,034

[45] Sept. 4, 1973

[54] METHOD AND APPARATUS FOR LAYING PIPELINES

[75] Inventors: Joe C. Lochridge; Leif H. Smith, both of Houston, Tex.

[73] Assignee: Brown & Root, Inc., Houston, Tex.

[22] Filed: Apr. 4, 1972

[21] Appl. No.: 240,378

[52] U.S. Cl................................. 61/72.3, 114/5 F
[51] Int. Cl........................... F16l 1/00, B63b 35/04
[58] Field of Search................... 61/72.3, 72.1, 72.4, 61/63; 114/.5 F

[56] References Cited
UNITED STATES PATENTS

| | | | |
|---|---|---|---|
| 3,566,609 | 3/1971 | Smith.................................. | 61/72.3 |
| 3,583,169 | 6/1971 | Morgan............................... | 61/72.3 |
| 3,525,226 | 8/1970 | McCarron......................... | 61/72.3 X |
| 3,633,369 | 1/1972 | Lawrence ........................ | 61/72.3 X |
| 3,214,921 | 11/1965 | Goepfert.............................. | 61/72.3 |

*Primary Examiner*—Jacob Shapiro
*Attorney*—James E. Cockfield et al.

[57] ABSTRACT

A method and apparatus for laying submergible pipelines or other elongate conduit means upon the bed of a body of water utilizing an elongate buoyancy means operably positionable within the interior of a pipeline for buoyantly supporting the pipeline in a span intermediate a floating vessel and the bed of a body of water.

In one embodiment the elongate buoyancy means comprises a plurality of regularly spaced articulated buoyancy chambers and in another embodiment the elongate means comprises a unitary elongate cylindrical buoyancy chamber. A retaining means is connected to the elongate buoyancy means within the interior of the pipeline during the laying operation to maintain the elongate buoyancy means at approximately a constant elevational position within the interior of the pipeline. In one embodiment the retaining means comprises a cable extending within the pipeline to an anchor at a fixed station and in other embodiments the retaining means includes an elongate cylindrical weight connected to the elongate buoyancy means or a floodable chamber portion of the elongate buoyancy means or friction means connected to the elongate buoyancy means. Frictional contact between the interior surface of the pipeline and the exterior surface of the elongate buoyancy means may be reduced by the provision of a plurality of rollers about the exterior surface of the elongate buoyancy means. A tensioner on board the floating vessel may be used in conjunction with the elongate buoyancy means within the interior of the pipeline to provide maximum pipeline support.

33 Claims, 15 Drawing Figures

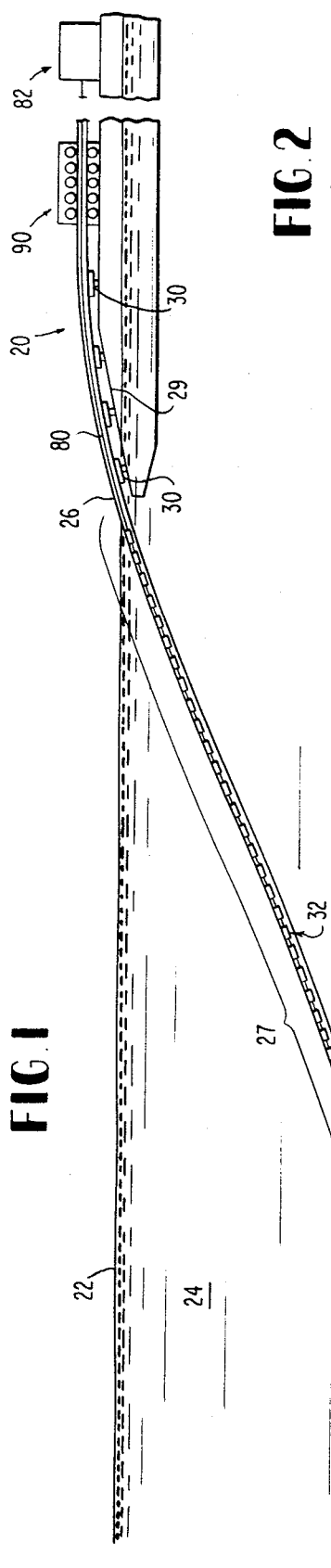
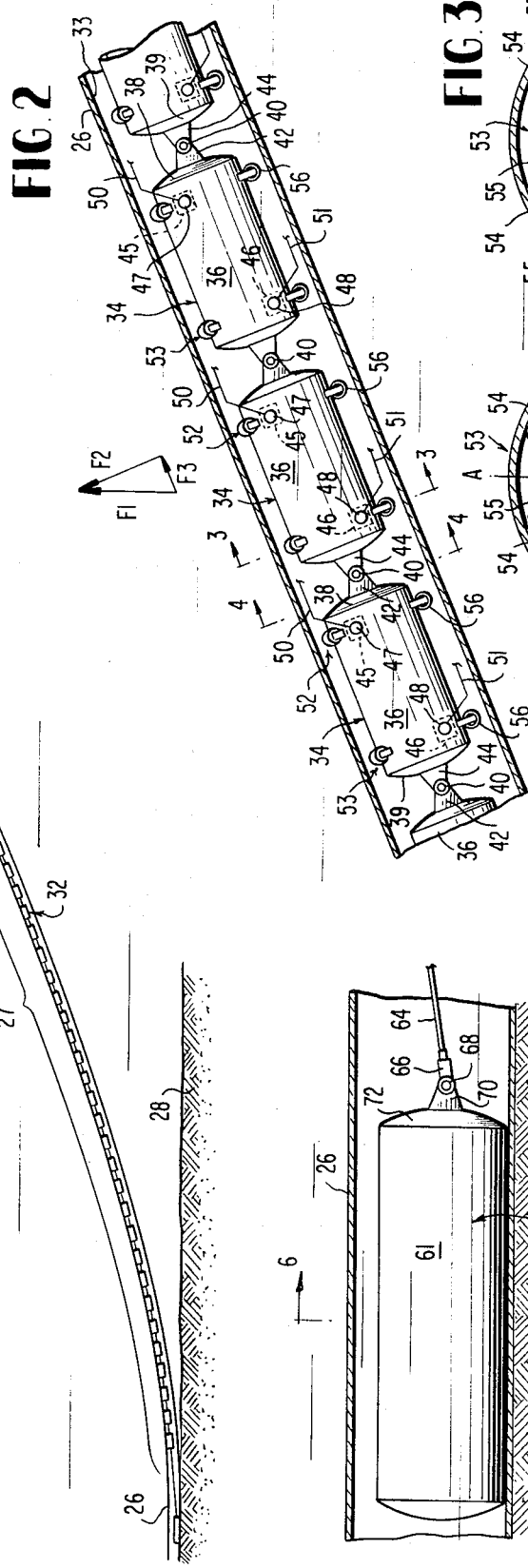
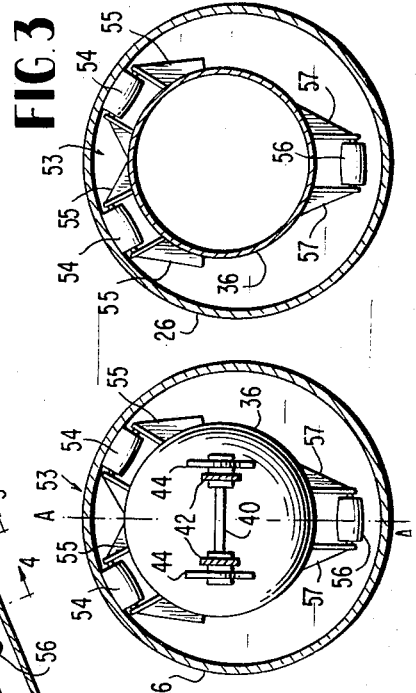
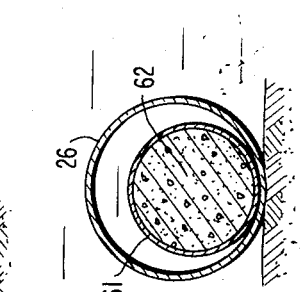
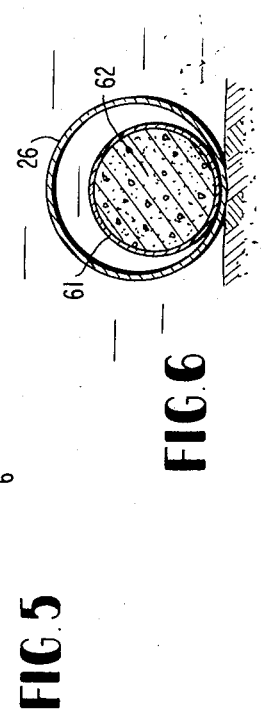

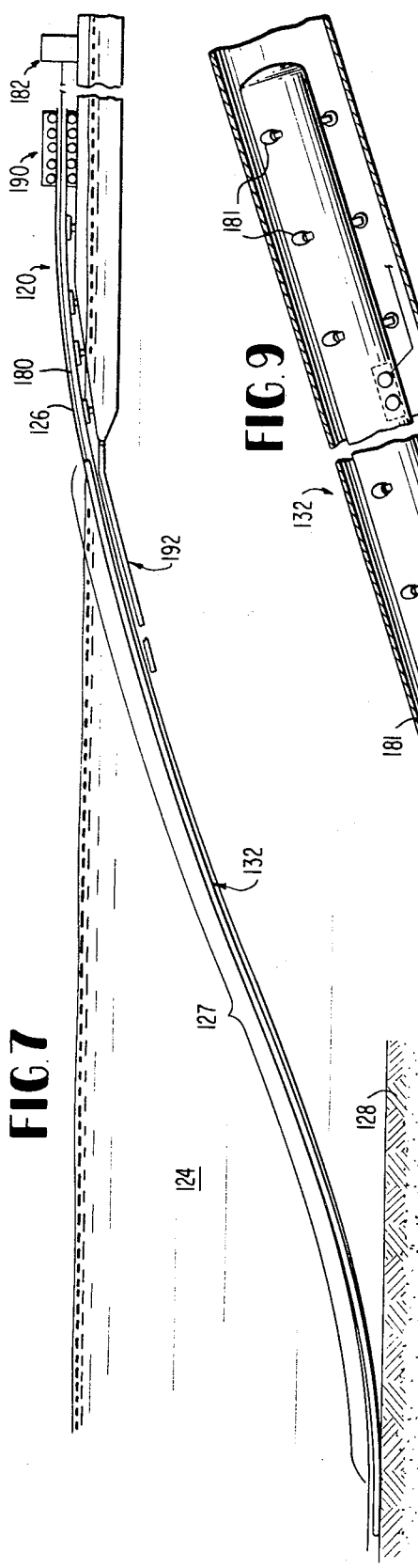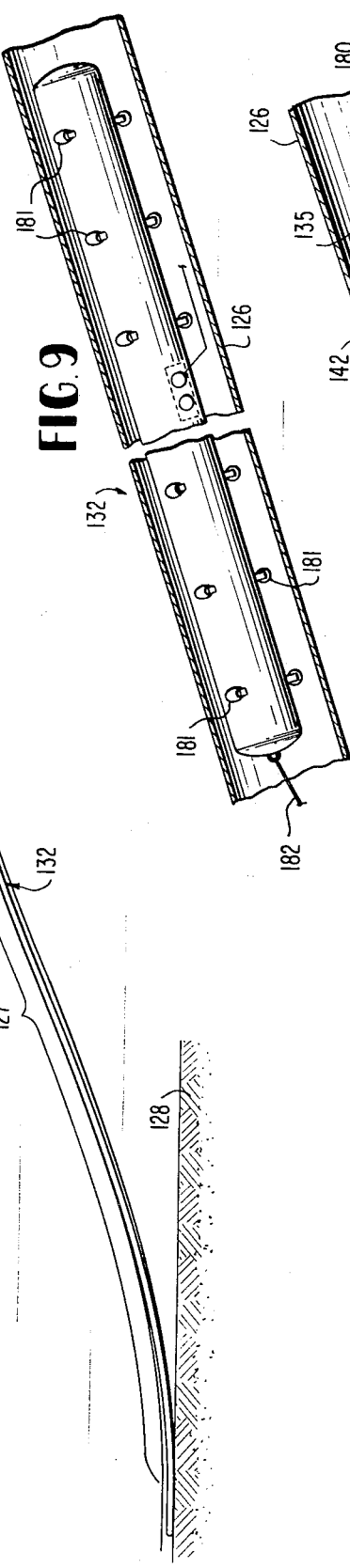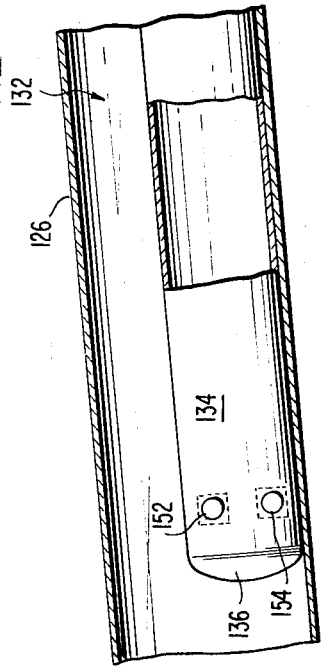

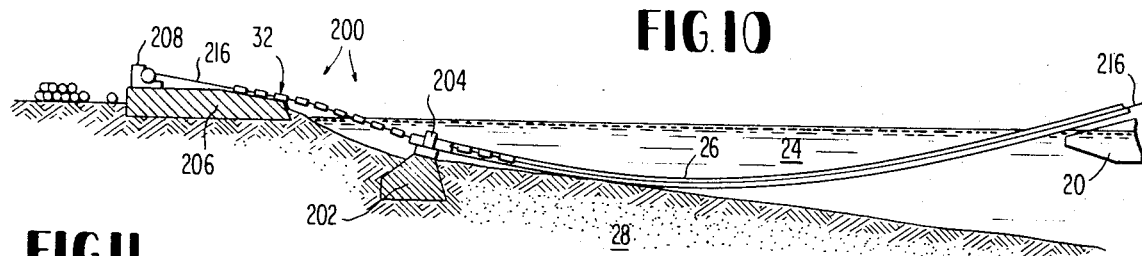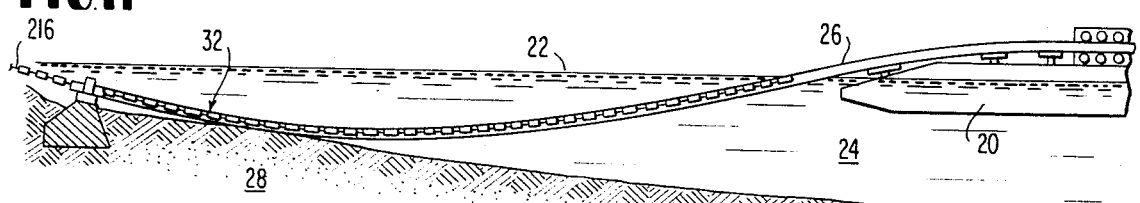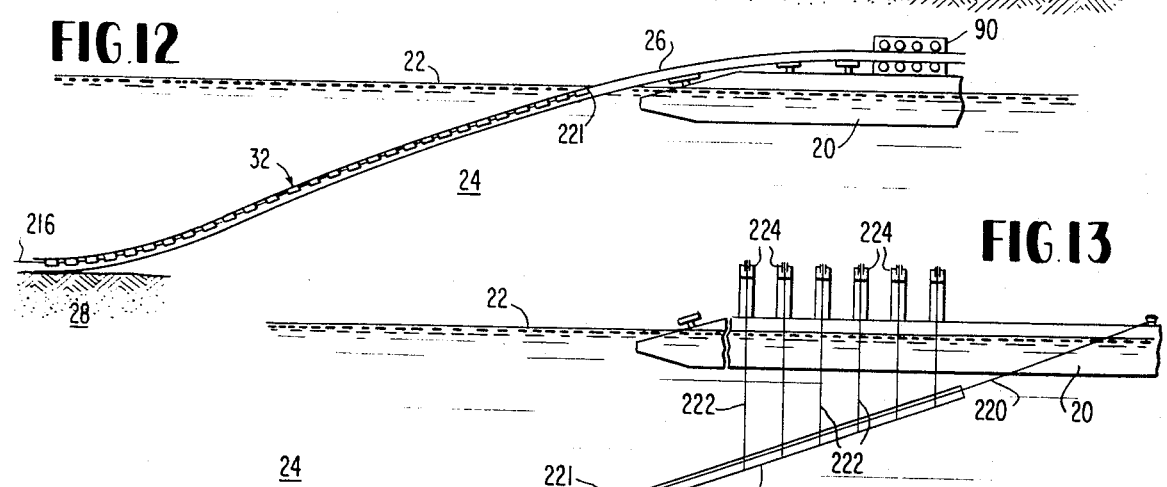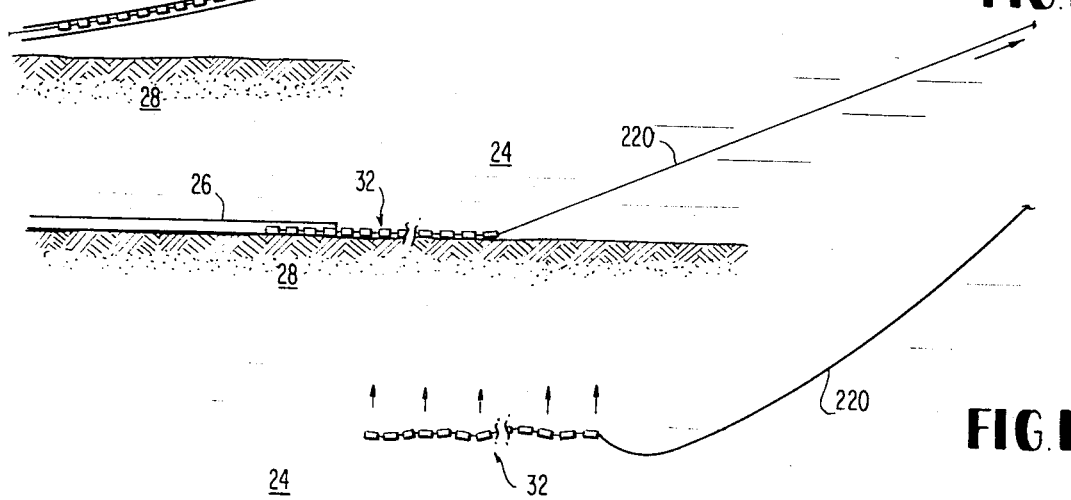

3,756,034

METHOD AND APPARATUS FOR LAYING PIPELINES

BACKGROUND OF THE INVENTION

The invention relates to a method and apparatus for laying elongate conduit means upon the bed of a body of water. More particularly, the invention relates to a method and apparatus for laying elongate submergible pipelines upon the bed of a body of water such as a river, lake or seabed.

In performing underwater pipelaying operations and the like which involve the laying of an elongate tubular conduit from a floating vessel onto the bed of a body of water, it is important that the elastic limit of the conduit is not unduly exceeded. In this connection if the radius of curvature of the conduit becomes too small, the conduit may become permanently deformed, cracked or otherwise rendered unserviceable.

In the past, in order to prevent such undesirable consequences, exterior supports have been utilized to cradle the pipeline in a span between the floating vessel and the water bed. More particularly stated, pipelaying operations have often utilized elongate, buoyant ramps pivotally attached to the stern of a floating pipelaying vessel. Generally, the ramps are comprised of elongated parallel sets of tubular pontoons joined by downwardly disposed U-shaped tubular cross members. A plurality of roller-like mechanisms are usually located on the cross members for the purpose of providing a slidable support for a pipeline depending from the floating vessel and into the body of water. The pontoons, while preferably metallic and unitary in character, are generally flexible owing to the relatively great length thereof. Examples of buoyant ramps of the above type are illustrated in Hauber et al. U.S. Pat. No. 3,280,571, and United States Lawrence U.S. Pat. Nos. 3,390,532 and 3,487,648, all of which are assigned to the assignee of the subject invention.

A further illustrative example of a buoyant ramp system, of the general type described above, is disclosed in Rochelle et al. U.S. Pat. No. 3,507,126, also assigned to the assignee of the subject invention. In the instance of this patent, the parallel sets of pontoons are articulated so as to be pivotally movable relative to one another so that the profile of the ramp means may be adjusted.

While apparatus of the above noted type has proven, under nominal conditions, to be consistently reliable in operation; structurally rugged for, among other things, resisting lateral pipeline bending; operationally manageable and economically desirable, and thus of considerable merit, room for significant improvements and/or alternative remains.

In this connection, as plans for nuclear power stations are finalized for locations along the coastal shore line, an increasing need has arisen to lay very large diameter pipelines or "outfalls" to a location offshore. More particularly stated, large diameter pipelines are needed to convey a high volume of sea water, which has been spent as a coolant in a power generating process, back to the sea at a depth and at a distance sufficient to minimize the possibility of raising the overall temperature of the sea water above an acceptable ecological level in laying large diameter pipelines. However, a critical bending radius is exhibited in the span between the stern of a pipelaying vessel and a seabed. Therefore, it is necessary to support the pipeline over a very long span in order to minimize the possibility of overstressing the pipeline. Unfortunately, conventional external buoyant ramps, which would be long enough for utility during a large diameter pipelaying operation are also likely to be initially very expensive, bulky to fabricate and handle, and once in position attached to the stern of the pipelaying vessel, potentially capable of transmitting tremendous loads to a pivotal hitch at the pipelaying vessel stern. Moreover, conventional exterior buoyant ramps, because of the U-shaped encompassing operative construction thereof, possess the disadvantage of not being dimensionally suitable for use with a wide variety of large diameter pipelines. Further, because of the U-shaped cradling construction of conventional ramps, strong hydrodynamic forces of the sea are free to directly impinge upon an extrior ramp structure. Such hydrodynamic forces sometimes tend to twist or "corkscrew" the ramp about the pipeline.

In addition to the need to lay large diameter pipelines, as offshore drilling and production extends seaward, concomitantly, a significant need for deep water pipelines will follow. However, pipelines designed to be laid in water depths of from several hundred to a thousand or more feet will require excessively long conventional exterior buoyant ramps to minimize the possibility of overstressing and buckling. Extremely long conventional ramps, however, possess a number of disadvantages, as previously noted hereinabove.

Therefore, it would be highly desirable to provide a method and apparatus for supporting an elongate conduit during a laying operation in a span between the bed of a body of water and a laying vessel which would be suitable for application with large diameter pipelines.

Moreover it would be highly desirable to provide a method and apparatus for supporting an elongate conduit during a laying operation in a span between the bed of a body of water and a laying vessel which will retain many of the proven advantages of prior ramps such as being consistently reliable in operation, stucturally rugged, operationally manageable and economically desirable.

Further, it would be desirable to provide a method and apparatus for supporting an elongate conduit during a laying operation which would not be directly subject to encountering high hydrodynamic loads and would be suitable for deep water application.

OBJECTS AND SUMMARY OF THE INVENTION

OBJECTS OF THE INVENTION

It is therefore a general object of the invention to provide a novel method and apparatus for buoyantly supporting an elongate conduit in a span between the bed of a body of water and a floating vessel which will obviate or minimize problems of the type previously described.

It is a particular object of the invention to provide a novel method and apparatus for supporting an elongate conduit within a body of water during a laying operation which will be suitable for use with large diameter conduits.

It is another object of the invention to provide a novel method and apparatus for supporting an elongate conduit within a body of water during a laying operation which will be consistently reliable in operation, structurally rugged, operationally manageable and economically desirable.

It is a further object of the invention to provide a novel method and apparatus for supporting an elongate conduit within a body of water during a laying operation which will not be directly subject to strong hydrodynamic forces of the sea during the laying operation.

It is yet another object of the invention to provide a novel method and apparatus for buoyantly supporting an elongate conduit during a laying operation within a body of water which may be effectively utilized for deep water laying operations.

BRIEF SUMMARY OF THE INVENTION

A preferred embodiment of the invention intended to accomplish at least some of the foregoing objects includes an elongate buoyancy means operably dimensioned to be positionable within the interior of a pipeline to be laid upon the bed of a body of water. In one embodiment the elongate buoyancy means "interior ramp" comprises a plurality of regularly spaced, articulated buoyancy chambers of preferably equal mass. In another embodiment, the elongate buoyancy means comprises a unitary cylindrical buoyancy chamber.

A retaining means is connected to the elongate buoyancy means to operably prevent the buoyant means from riding up the interior surface of the pipeline. In one embodiment the retaining means comprises a flexible wire rope or the like connected to the elongate means and threaded through the interior of the pipeline back to an anchor position at the origin of the pipelaying operation. In this connection, the anchor position may be on shore or on an artificial island such as a drilling tower or the like. An alternate means to retain the internal buoyant support within the interior of the pipeline being laid comprises a retaining anchor suitably connected to the interior buoyant support by a fixed length wire rope or the like. The anchor may be a cylindrical weighted member or a device having friction slips suitable to engage the interior surface of the pipeline being laid to offer a predetermined degree of resistance to forward movement. A still further means for retaining the elongate buoyant means within the interior of the pipeline includes ballasting and/or providing friction slips on a portion of the elongate means.

In some instances roller means may be connected to the outer surface of the elongate means to reduce frictional contact between the elongate buoyancy means and the interior surface of the pipeline being laid.

Where a maximum amount of profile and/or stress control is desired for the span of pipeline extending between a floating vessel and the bed of a body of water, a tensioner on board the floating vessel may be used in conjunction with an interior ramp.

THE DRAWINGS

Other objects and advantages of the present invention will become apparent from the following detailed description of preferred embodiments of the invention taken in conjunction with the accompanying drawings, wherein:

FIG. 1 is a schematic view of the subject invention including a plurality of regularly spaced articulated buoyancy members positioned within the interior of a pipeline to be laid and connected at a lower end thereof to a retaining means and at an upper end thereof to a floating vessel;

FIG. 2 is a side elevational, broken away view of a portion of the articulated train of buoyancy chambers;

FIG. 3 is a cross-sectional view taken along section line 3—3 in FIG. 2;

FIG. 4 is a cross-sectional view taken along section line 4—4 in FIG. 2;

FIG. 5 is a side elevational, broken away view of a retaining means suitable to retain the articulated train of buoyancy chambers within the interior of the pipeline being laid;

FIG. 6 is a cross-sectional view taken along section line 6—6 in FIG. 5;

FIG. 7 is a schematic view of an alternate embodiment of the subject invention including a unitary elongate cylindrical buoyancy member positioned within the interior of a pipeline to be laid and connected at the upper end thereof to a floating vessel;

FIG. 8 is a side elevational, broken away view of a portion of the unitary elongate buoyancy member including a ballast section and friction collar at the uppermost end thereof;

FIG. 9 is a side elevational, broken away view disclosing a unitary buoyancy chamber positioned within a pipeline and spaced from frictional engagement therewith by a plurality of rollers;

FIGS. 10–15 sequentially disclose a method of laying, according to a preferred embodiment of the invention, a hollow conduit including the steps of: positioning a pipeline between a shore location and a floating vessel; threading a plurality of regularly spaced articulated buoyancy chambers within the interior thereof; beginning to lay the conduit in relatively shallow water wherein the conduit span between the floating vessel and the water bed is supported by the articulated buoyancy chambers; retaining the articulated buoyancy chambers at a relatively constant elevation within the pipeline by means of a wire rope retainer threaded through the pipeline back to the shore location; laying the conduit in deep water supported by the internal articulated buoyancy chambers and a tensioner unit positioned on board the floating vessel; connecting a line to the upper end of the plurality of articulated buoyancy chambers; lowering the free end of the conduit onto the water bed; flooding the chambers; withdrawing the plurality of flooded articulated buoyancy chambers from within the interior of the pipeline conduit; and blowing the articulated buoyancy chambers to raise the chambers to the surface for subsequent use.

DETAILED DESCRIPTION

Referring now to the drawings and particularly FIG. 1 thereof, there will be seen a schematic illustration of a floating vessel or pipelaying barge 20 floating upon the surface 22 of a body of water 24. Extending into the body of water from the stern of the floating vessel 20 is a tubular conduit or pipeline 26.

The pipeline 26 is typically fabricated from steel and exteriorly coated, for corrosion prevention, with a mastic material. In those instances, where it is anticipated that the pipeline will carry water, an interior coating of mastic or the like may also be applied. Where it is known that the pipeline will carry oil or gas, the interior mastic coating is unnecessary; however, it may then be desirable to add an exterior weight coating of concrete or the like over the exterior coat of mastic.

The pipeline is normally stored on board the floating vessel in sections. During a pipelaying operation, the sections are "made up" or joined together by being welded end to end and pushed off the stern of the barge During a pipelaying operation, according to one embodiment of the invention, in order to maintain the interior articulated buoyancy chambers at a generally constant elevational level within the interior of the pipeline, a cable 80 is connected to the uppermost one of the buoyancy chambers and is threaded through the interior of the pipeline up to an anchor 82 on the deck of the pipelaying barge 20. Thus, as the pipeline is laid, by the barge advancing, the interior articulated buoyancy ramp will advance also. It will be appreciated, however, that as pipeline segments are raised into position and welded to the end of the pipeline 26, the cable 80 extending within the interior of the pipeline 26, must necessarily be detached from the anchor 82. Alternatively the cable may be attached to a conventional internal pipe line-up clamp.

While the above description is believed to be adaquate to enable those skilled in the art to practice the invention, a more detailed description of a suitable interior cable handling technique is disclosed in a co-pending Jones application Ser. No. 147,834, assigned to the assignee of the subject invention. The relevant disclosure of the Jones application is hereby incorporated by reference as though set forth at length.

In some instances where it is desirable to supplement the pipeline profile control of the interior articulated buoyancy chambers 34 an external pipeline tensioning unit 90 may be employed, such as illustrated in FIG. 1, positioned on deck the pipelaying barge. For a detailed discussion of a tensioning unit and method of operation suitable for use in this connection, reference may be had to Lawrence U.S. Pat. Nos. 3,390,532 and 3,487,648, the disclosures of which are hereby incorporated by reference.

An alternate embodiment of the subject invention is illustrated in FIG. 7. A conventional pipelaying barge 120 is disclosed suitable to make up and lay a pipeline 126 upon the bed 128 of a body of water 124. In order to support a free span 127 of the pipeline extending between the stern of the pipelaying barge 120 and the water bed 128 from columnar loading and undue stress, a unitary elongate cylindrical buoyancy means 132 is positioned within the interior of the pipeline.

By referring to FIG. 8, there will be seen a more detailed view of the unitary elongate buoyancy means 132. More particularly, the unitary elongate support means 132 is designed having an outer cylindrical shell 134 which is dimensionally fabricated to be suitable to extend within the pipeline 126 and buoyantly support the pipeline in the span 127. The outer cylindrical shell 134 is provided at the ends thereof with weld caps 136 to form an enclosed buoyant chamber.

The unitary support 132 in one embodiment (not shown) may be provided with a plurality of interior bulkheads to permit the buoyancy of the elongate member to be varied so that the elongate member may be suitable for use with a variety of pipeline sizes.

In order to retain the elongate buoyancy chamber 132 in a proper posture within the pipeline span 127, the upper end thereof may be provided with a bulkhead 138. The bulkhead enables an upper portion 140 of the chamber 132 which extends above the surface of the water within the interior of the pipeline to be flooded and thus to serve to counteract the previously discussed rising force of the buoyant chamber 132.

An alternate or additive force to the downward force provided by the chamber portion 140 may be achieved by the provision of a friction collar 142 surrounding an upper portion of the buoyancy chamber 132. The friction collar which is generally illustrated may be fabricated in accordance with conventional techniques to provide a controllable frictional contact between the interior of the pipeline 126 and the buoyancy chamber 132. In order to facilitate the functioning of collar 142 fore and aft roller sets 143 and 144 are connected to the chamber 132 by conventional brackets (not shown). The above noted friction collar not only achieves the desirable function of assisting to retain the elongate buoyancy chamber 132 within the pipeline, but also, thereby axial tension is applied to the pipeline, to resist columnar pipeline buckling in the span between the floating vessel and the sea-bed.

Behind the bulkhead 138 are vent and flood valve means 152 and 154 respectively connected (not shown) for actuation at a remote location such as on board pipelaying vessel 120. Valve means 152 and 154 enable the portion of the unitary buoyancy chamber 132 aft of the bulkhead 138 to be flooded and thus facilitate removal in a manner to be more fully discussed hereinafter.

As previously discussed in connection with the articulated internal ramp, the forward end of the unitary internal ramp may be connected to a towing cable 180 which, in turn, may be anchored onto a deck anchor 182. Thus as the barge 120 advances, the unitary interior ramp will also advance and remain at approximately a constant elevational level within the interior of the pipeline 126.

A still further aspect of the subject invention is disclosed in FIG. 9 wherein the unitary elongate buoyancy chamber 132 is provided with external roller means 181, such as previously described in connection with FIGS. 2–4, to minimize surface friction between the unitary internal chamber 132 and the internal surface of the pipeline 126.

In this connection, in addition to the reasons previously discussed, it is sometimes desirable to minimize internal frictional contact during some types of laying operations to induce the unitary chamber 132 to rise within the interior of the pipeline 126 in order to advance the unitary chamber 132 as the pipeline is progressively laid. More particularly, during some offshore laying operations, no internal contact between the unitary elongate chamber 132 and the floating vessel 120 need be established. Rather, advance of the unitary support 132 is achieved by paying out a retaining cable 182 connected between the lower end of the unitary elongate chamber 132 and a payout winch anchored at the origin of the pipelaying operation.

OPERATION

One preferred method of laying an elongate pipeline by the subject invention is schematically illustrated in FIGS. 10–15. Referring particularly to FIG. 10, there will be seen a pipeline 26 suspended within a body of water 24 between the stern of a pipelaying vessel 20 and a shore station designated generally at 200. In this connection, the shore station may include an anchor block 202 with a pipe mounting collar 204 suitable to clamp an initial end of a pipeline to be laid in a posture preferably slightly beneath the surface of the body of water. In some instances, the pipe clamp may not be necessary and the weight of the conduit may be sufficient to maintain the free end of the conduit in a relainto the body of water. As the pipeline is payed off the vessel into the body of water, it is flooded and therefore tends to bend and sink downwardly onto the water bed 28.

In order to facilitate a gradual bend or smooth profile of the pipeline in a zone at the stern of the barge, and thus avoid undue stress upon the pipeline, the barge 20 is typically fabricated with an inclined ramp 29. Support for the pipeline on the barge is provided by a plurality of aligned roller shoes 30 which normally project from the barge deck and ramp. For an expanded illustration of suitable pipe support shoes reference may be had to Lawrence U.S. Pat. No. 3,309,532 and particularly to FIGS. 8 and 9 thereof.

In order to support the pipeline 26 in a sloping span 27 which extends from the stern of the floating vessel 20 down to the bed 28 of the body of water an elongate buoyancy means 32 is positioned in contact within the interior of the pipeline.

One embodiment of the elongate buoyancy means "interior ramp" 32 is illustrated in more detail in FIG. 2. In this connection, a plurality of uniform hollow buoyancy chambers 34 are shown equally spaced with respect to one another and pivotally connected end to end to form an articulated train.

Each chamber 34 includes a generally cylindrical lateral shell portion 36 enclosed at the fore and aft ends thereof by weld caps 38 and 39, respectively. The individual buoyancy chambers 34 are pivotally connected end to end by generally horizontally extending pins 40, note FIG. 5. More specifically, the pins 40 extend through apertures formed in the end portions of male and female hinge brackets 42 and 44 which normally project from the fore and aft ends, respectively, of adjacent buoyancy chambers. The spacing of brackets 42 and 44 provides a desirable degree of resistance to lateral bending of the articulated train during a pipelaying operation. While lateral stiffness is desirable and preferred, in some instances lateral flexibility may also be desired. In that event, lateral hinging action may be provided for the hinge brackets 42 and 44.

For purposes of recovery, which will be discussed more fully hereinafter, each of the buoyancy chambers 34 is provided with a vent and flood valve well 45 and 46, respectively, fashioned into the lateral shell 36. The valve wells 45 and 46 each include a valve means 47 and 48 which may be selectively operable to provide fluid communication with the interior and exterior of the buoyancy chamber. Moreover, each valve means 47 and 48 may be remotely actuated by a signal carried by lines 50 and 51 threaded through the interior of the pipeline back to a control panel (not shown) on board the pipelaying barge 20.

It is a preferred form of the invention to have the internal articulated train 32, as illustrated in FIG. 1, extend within the interior of the pipeline 26 with frictional contact between an upper portion of lateral surface 36 of the buoyancy chambers 34 and the pipeline internal surface 33. In some instances, however, such as for example during an initial makeup operation, or to protect an internal pipeline coating (not shown), or to reduce drag during a laying operation, it may be desirable to minimize frictional contact between the internal articulated train of buoyancy chambers 32 and the interior surface 33 of the pipeline 26.

In this connection and as illustrated in FIGS. 2-4, internal frictional contact may be reduced by provision of a fore and aft set of rollers 52 and 53 respectively for each buoyancy chamber 34. Each roller set may include a pair of upper rollers 54 equally spaced on opposite sides of a plane A—A intersecting a mid point of shaft 40 and lying normally with respect thereto. The rollers 54 may each be journaled for rotation between upstanding support brackets 55 which are fixedly attached to the lateral shell 36.

While it is anticipated that the buoyancy chambers 34 will primarily be in contact with an upper portion of the internal pipeline surface 33 during a pipelaying operation, in some instances such as, during makeup and/or retrieval operations, the chambers 34 may contact a lower portion of the interior pipeline surface 33. In such an event, a lower roller 56 may be provided mounted symmetrically with respect to plane A—A and journaled for rotation upon brackets 57.

While a triangular roller arrangement for roller sets 52 and 53 are particularly illustrated, it may often be desirable to provide four or more rollers equally spaced circumferentially in each set to heighten the overturning stability of the system.

As viewed in FIG. 2, an upward force vector, F1, represents the buoyant force of an individual buoyancy chamber 34, and includes a component, F2, normal with respect to the surface of the pipeline, and a component, F3, longitudinal with respect to the surface of the pipeline. The longitudinal components, F3, of each of the individual chambers, when summed together, in some instances are of such magnitude that the frictional contact between the inner surface 33 of the pipeline 26 and the outer surface 36 of the chambers 34 is insufficient to retain the articulated train within the interior of the pipeline with the resultant tendency of the chambers to creep upwardly toward the barge. This tendency is accentuated in those instances where rollers are mounted upon the surface of the buoyancy chambers as previously described.

In order to offset the tendency of the articulated train of buoyancy chambers to rise within the pipeline, a retaining means 60 is positioned within the pipeline 26 preferably, in at least one embodiment, at the lower end of the internal articulated train of buoyancy chambers as shown in FIG. 1.

The retaining member 60, as illustrated in FIGS. 5 and 6, may be formed from a segment of pipeline 61 filled with aggregate and a binder such as cement, to form a "weight" 61. The weight 61 may be connected to the end of the articulated string 32 by means of a flexible wire rope or cable 64. In this connection, the cable 64 is connected to the retaining member 60 by means of a clevis 66 and pin 68 attached to a pad eye 70. The pad eye 70 in turn is welded to an end cap 72 of the weight 61. A similar connection may be made between the wire cable 64 and an aft portion of the endmost buoyancy chamber 34.

The weight 61 is designed to create a normal force sufficient in magnitude to form a high frictional contact force between the inner surface of the pipeline 33 and the outer skin of the weight 61 and thus counteract the summation of component forces, F3, tending to push the articulated ramp up the pipeline 26. In the event the pipeline is provided with an internal coating the weight may be provided with rollers (not shown) with brake means connected to the rollers to protect the internal lining from becoming scarred.

tively stationary posture along a shore line. Positioned at the shore station 200 is also another anchor 206 with a cable winch 208 mounted thereupon.

In laying a pipeline 26 within a body of water between a shore and offshore location, the pipeline is initially suspended, as previously mentioned, between a shore station 200 and a floating pipelaying vessel 20. It should be appreciated that the pipeline will be interiorly filled with water up to the ambient water level since the initial end of the pipeline is positioned with at least a portion of the opening thereof beneath the surface 22 of the body of water 24.

Either the articulated 32 or unitary 132 embodiment of the subject interior elongate support means may then be threaded into the initial end of the pipeline 26 and pulled interiorly thereof by a cable 210, which may be wound upon a suitable deck winch (not shown), mounted upon the pipelaying vessel 20. As previously discussed, it may be desirable to utilize rollers 54 and 56 with the elongate buoyant support, at least for the reason to facilitate the initial threading of the elongate buoyant support within the interior of the pipeline 26. The elongate buoyant means will displace water from within the interior of the negatively buoyant pipeline and create an upward force thereupon to partially support the pipeline in the span beetween the end of the pipelaying vessel 20 and the bed of the body of water. Moreover, the articulated or the unitary elongate support can also be made up progressively on board the vessel, in the interior of the pipeline as successive pipe joints are welded together. In this case the elongate support can be anchored to a location at the beginning of the pipeline or to an anchor on shore or on an artificial island.

Referring now to FIG. 11, it will be seen that as the pipelaying operation progresses and the pipelaying vessel 20 moves away from the shoreline, the elongate buoyant support 32 may be pulled up into a posture wherein the uppermost portion of the elongate buoyant support is adjacent the surface of the body of water. When the elongate support means reaches this posture within the pipeline 26, the wire rope 210, which was utilized to position the elongate member within the pipeline may be severed and withdrawn from the interior thereof or retained as desired.

As previously discussed, in many instances the elongate buoyant support will have a tendency to move from left to right, as viewed in FIG. 11, or up the inclined pipeline span toward the deck of the pipelaying vessel 20. This upward creeping movement is restrained by the provision of a flexible wire cable 216 trained at one end around winch 208 and connected at the other end to a lowermost portion of the elongate buoyant support.

Turning now to FIG. 12, there will be seen a schematic illustration of a position of the pipelaying vessel 20 and the pipeline 26 at a point midway during the laying operation. The uppermost portion of the elongate buoyancy supporting member 32 may be maintained at a posture approximately at the surface level 22 of the body of water 24 by the inherent tendency of the supporting means 32 to rise, as previously mentioned, and the concomitant controlled paying out of wire cable 216 from the winch 208.

Regulation of the paying out operation may be achieved by visual detection of the position of the uppermost portion 221 of the elongate support member, and radio or sight contact with an operator on shore operating the winch 208. Alternatively the payout operation may be completely automated by utilization of a position sensing means (not shown) coupled to an uppermost portion of the elongate support member which will indicate proximity of the initial chamber to the surface of the water within the elongate conduit or the stern of the barge 30. Suitable signal relay means may then be connected to the sensing means to control winch 208.

In those instances where it is desired to augment or assist the supporting function of the interior buoyant support means 32, a tensioning unit 96, as previously discussed, may be used to advantage on board the pipelaying barge 20.

Turning now to FIG. 13, upon completion of the laying operation, a flexible wire rope 220 may be connected to the upper end 221 of the elongate support means 32 to retain control of the support means during recovery. In order to controllably lower the pipeline onto the water bed 28 a plurality of davit lines 222 may be connected to an end portion 223 thereof and trained over a corresponding number of davits 224 mounted on board the pipelaying barge 20.

Turning now to FIG. 14, it will be seen that once the pipeline 26 is lowered onto the bed of the body of water, the elongate support means may be flooded by actuation of valves 47 and 48. The support means 32 may then be withdrawn from the end of the pipeline by tensioning line 220 by a deck winch (not shown).

As depicted in FIG. 15, once the elongate floatation means is withdrawn from the interior of the pipeline, the individual chambers may be blown by means of a diver connecting an air hose or other suitable means thereto and the interior ramp may be floated to the surface for subsequent reuse.

While the description in conjunction with FIGS. 13, 14 and 15 was predicated on the assumption that the elongate buoyancy chambers would be flooded, such a flooding operation, to remove the elongate buoyancy means from within the interior of the pipeline, may not be entirely necessary in all instances, particularly when surface rollers are utilized. In the absence of flooding it will be appreciated that the elongate means will rise to the surface as soon as the support means is withdrawn from the free end of the conduit 26.

While the above operational description taken with reference to schematic illustrations 10-15 discloses a pipeline being laid from an initial position at a shore station or a fixed station at sea, the subject invention may be utilised for all conventional pipelaying operations such as, for example, between artificial islands and a collection station or from an artificial island and a shore location.

In this event, the elongate buoyancy means 32 or 132 may be fed into the pipeline as the initial pipeline segments are payed out into the body of water. Upon reaching a stabilized posture for advancing laying operation, such as schematically illustrated in FIG. 12, the laying operation, as previously described with reference to FIGS. 12-15, fully applies with the exception that instead of utilizing retaining line 212 travelling back to a winch at a fixed station, the buoyancy means may be maintained within the pipeline by connection to a retaining member or an upper ballast chamber or friction collar all as previously discussed.

The relative elevational posture of the elongate buoyancy means within the interior of the pipeline 26 is maintained by connecting a wire rope 180, note FIG. 8, from the uppermost end of the elongate buoyancy means to a deck anchor 182, note FIG. 7. In order to add pipe segments to the pipeline, it is necessary to make and break the connection between the wire rope retaining line 180 and the deck anchor 182 in a manner as previously discussed. Alternatively the cable may be attached to a conventional internal pipe line-up clamp.

SUMMARY OF THE MAJOR ADVANTAGES

From the foregoing it should be appreciated that the subject invention provides a method and apparatus for supporting the free span of a pipeline between a pipelaying vessel and the bed of a body of water while laying a wide variety of pipeline sizes including extremely large diameter pipes.

Further, the subject invention provides a method and apparatus for supporting the free span of a pipeline between a pipelaying vessel and the bed of a body of water by structure positioned interiorly within the pipeline to be laid and thus is shielded from direct impingement of strong hydrodynamic forces of the sea.

Still further both the articulated and unitary interior ramps of the subject invention are ruggedly designed and may possess a resistance to lateral pipeline bending. Moreover the unitary interior ramp provides a significant degree of both lateral and vertical stiffness to the pipeline as it is laid.

Additionally, the articulated interior ramp is composed of individual chambers of equal dimension. Therefore it is possible to interchange chambers if one chamber should become damaged.

Moreover, the subject invention provides a method and apparatus for supporting the free span of a pipeline between a pipelaying vessel and the bed of a body of water which is reliable in operation, structurally rugged, operationally manageable and economically desirable.

Further, from the foregoing, it will be appreciated that the subject invention provides a method and apparatus for supporting the free span of a pipeline between a pipelaying vessel and the bed of a body of water during deep water laying operations.

While the invention has been described with reference to preferred embodiments, it will be appreciated by those skilled in the art that additions, deletions, modifications and substitutions or other changes not specifically described may be made which will fall within the purview of the appended claims.

What is claimed is:

1. Apparatus for supporting an elongate pipeline span between a floating vessel and the bed of a body of water during a pipe laying operation from a fixed station comprising:
    elongate means operably positionable within the interior of the pipeline for buoyantly supporting a portion of the pipeline between the floating vessel and the water bed;
    retaining means extending within the pipeline and having a first end operably connected at the fixed station and a second end connected to said elongate means for axially retaining said elongate means within said pipeline; and
    pay out means fixedly positioned adjacent the fixed station and being connected to said first end of said retaining means for paying out said retaining means and permitting said elongate means to controllably axially translate within the interior of the pipeline as the pipeline is progressively laid and thus said elongate means remaining at approximately a constant relative elevational level within the pipeline as the pipeline is progressively laid.

2. Apparatus for supporting an elongate pipeline span between a floating vessel and the bed of a body of water during a pipelaying operation as defined in claim 1 wherein:
    said retaining means comprises,
        a flexible wire rope; and
    said pay out means comprises,
        a pay out winch.

3. Apparatus for supporting an elongate pipeline span between a floating vessel and the bed of a body of water during a pipelaying operation as defined in claim 1 wherein said elongate means comprises:
    an articulated train of buoyancy chambers.

4. Apparatus for supporting an elongate pipeline span between a floating vessel and the bed of a body of water during a pipelaying operation as defined in claim 3 and further comprising:
    roller means connected to the outer surface of each of said buoyancy chambers for reducing the frictional contact between said buoyancy chambers and the internal surface of the pipeline.

5. Apparatus for supporting an elongate pipeline span between a floating vessel and the bed of a body of water during a pipelaying operation as defined in claim 3 and further comprising:
    means connected to each of said chambers for controllably varying the buoyancy thereof.

6. Apparatus for supporting an elongate pipeline span between a floating vessel and the bed of a body of water during a pipelaying operation as defined in claim 1 wherein said elongate means comprises:
    a unitary elongate cylindrical chamber.

7. Apparatus for supporting an elongate pipeline span between a floating vessel and the bed of a body of water during a pipelaying operation as defined in claim 6 and further comprising:
    roller means connected to the outer surface of said elongate cylindrical chamber for reducing the frictional contact between said elongate cylindrical chamber and an internal surface of the pipeline.

8. Apparatus for supporting an elongate pipeline span between a floating vessel and the bed of a body of water during a pipelaying operation as defined in claim 6 and further comprising:
    means connected to said elongate cylindrical chamber for controllably varying the buoyancy thereof.

9. Apparatus for supporting an elongate pipeline span between a floating vessel and the bed of a body of water during a pipelaying operation comprising:
    a plurality of equally spaced buoyancy chambers of equal mass pivotally connected end to end to form an articulated train of buoyancy chambers and operable to be positioned within the interior of the pipeline during the pipelaying operation, said articulated train of buoyancy chambers in operable position having a first end directed generally toward the floating vessel and being situated in a posture substantially at the surface of the body of water and a second end directed generally toward the bed of the body of water and being situated in a posture substantially at the bed of the body of water;

means connected to said articulated train of buoyancy chambers for operably extending through the pipeline and connection to the floating vessel to enable the articulated train of buoyancy chambers to be pulled through the pipeline at approximately a constant relative elevational level within the pipeline as the pipeline is progressively laid; and retaining means connected to said articulated train of buoyancy chambers for operably extending within the pipeline to retain the articulated train of buoyancy chambers within the interior of the pipeline, said retaining means comprising a generally cylindrical weight operably positionable within the interior of the pipeline.

10. Apparatus for supporting an elongate pipeline span between a floating vessel and the bed of a body of water as defined in claim 9 and further comprising:

means connected to each of said buoyancy chambers for controllably varying the buoyancy thereof.

11. Apparatus for supporting an elongate pipeline span between a floating vessel and the bed of a body of water as defined in claim 9 and further comprising:

roller means connected to the outer surface of each of said buoyancy chambers for reducing the frictional contact between said buoyancy chambers and the internal surface of the pipeline.

12. Apparatus for supporting an elongate pipeline span between a floating vessel and the bed of a body of water as defined in claim 9 wherein said plurality of regularly spaced buoyancy chambers of equal mass are pivotally connected end to end by:

first bracket means having laterally spaced arms extending from an operable aft end of each of said buoyancy chambers;

second bracket means having laterally spaced arms extending from an operable fore end of each of said buoyancy chambers; and coupling means for pivotally connecting first bracket means with second bracket means of adjacent buoyancy chambers to connect said individual buoyancy chambers into an articulated train having a degree of lateral bending resistance.

13. Apparatus for supporting an elongate pipeline span between a floating vessel and the bed of a body of water during a pipelaying operation comprising:

a unitary elongate cylindrical chamber operably positionable within the interior of the pipeline and having a first end directed generally toward the floating vessel and said first end being situated in a posture substantially at the surface of the body of water and a second end directed generally toward the bed of the body of water and said second end being situated in a posture substantially at the bed of the body of water;

means connected to said elongate cylindrical chamber for operably extending through the pipeline and connection to the floating vessel to enable the elongate cylindrical chamber to be pulled through the pipeline at approximately a constant relative elevational level within the pipeline as the pipeline is progressively laid; and retaining means connected to said elongate cylindrical chamber for operably extending within the pipeline to retain said elongate cylindrical chamber within the interior of the pipeline.

14. Apparatus for supporting an elongate pipeline span between a floating vessel and the bed of a body of water as defined in claim 13 and further comprising:

means connected to said elongate cylindrical chamber for controllably varying the buoyancy thereof.

15. Apparatus for supporting an elongate pipeline span between a floating vessel and the bed of a body of water as defined in claim 13 and further comprising:

roller means connected to the outer surface of said elongate cylindrical chamber for reducing the frictional contact between said elongate cylindrical chamber and the internal surface of the pipeline.

16. Apparatus for supporting an elongate pipeline span between a floating vessel and the bed of a body of water as defined in claim 13 wherein said retaining means comprises:

a generally cylindrical weight operably positionable within the interior of the pipeline.

17. Apparatus for supporting an elongate pipeline span between a floating vessel and the bed of a body of water as defined in claim 13 wherein said retaining means comprises:

a ballast chamber formed within the unitary elongate cylindrical chamber.

18. Apparatus for supporting an elongate pipeline span between a floating vessel and the bed of a body of water as defined in claim 13 wherein said retaining means comprises:

friction means connected to said unitary elongate cylindrical chamber for frictionally engaging the interior surface of the elongate pipeline.

19. A method for laying an elongate pipeline upon the bed of a body of water from a fixed station comprising the steps of:

suspending a pipeline to be laid upon the water bed between the fixed station and a floating vessel;

flooding the interior of the pipeline;

positioning an elongate buoyancy means within the interior of the pipeline for buoyantly supporting the pipeline span between the floating vessel and the bed of the body of water during the pipelaying operation;

retaining the elongate buoyancy means within the interior of the pipeline with retaining means extending from the elongate buoyancy means back through the pipeline to the fixed station; and progressively laying the pipeline upon the bed of the body of water by, paying the pipeline off the floating vessel into the body of water; while simultaneously paying out the retaining means from the station as the pipeline is laid to permit the buoyant elongate means to axially translate within the interior of the pipeline and thus remain at approximately a constant relative elevational level within the pipeline as the pipeline is progressively laid.

20. A method for laying an elongate pipeline upon the bed of a body of water as defined in claim 19 wherein said step of positioning comprises:

feeding a plurality of regularly spaced buoyancy chambers of equal mass pivotally connected end to end into the pipeline to form an articulated train of regularly spaced buoyancy chambers.

21. A method for laying an elongate pipeline upon the bed of a body of water as defined in claim 19 wherein said step of positioning comprises:

feeding a unitary elongate cylindrical buoyancy chamber into the pipeline.

22. A method for laying an elongate pipeline upon the bed of a body of water as defined in claim 19 wherein said step of retaining comprises:
connecting a flexible wire rope between the elongate buoyancy means and an anchor means positioned at the fixed station.

23. A method for laying an elongate pipeline upon the bed of a body of water as defined in claim 19 and further comprising the step of:
tensioning the pipeline by tensioning means positioned on board the floating pipelaying vessel to assist the elongate buoyancy means in supporting the pipeline span between the floating vessel and the bed of the body of water during the pipelaying operation.

24. A method for laying an elongate pipeline upon the bed of a body of water comprising the steps of:
paying out the pipeline from a vessel floating upon the surface of the body of water, into the body of water and onto the bed of the body of water;
flooding the interior of the pipeline;
buoyantly supporting the pipeline from within the interior thereof in a span between the floating vessel and the bed of the body of water with a plurality of regularly spaced, equal mass, articulated buoyancy chambers positioned within the interior of the pipeline; and
maintaining the plurality of buoyancy chambers at approximately a constant relative elevational level within the pipeline as the pipeline is progressively laid onto the bed of the body of water, by
connecting an elongate weight onto a lower end of the plurality of buoyancy chambers to retain the buoyancy chambers within the interior of the pipeline.

25. A method for laying an elongate pipeline upon the bed of a body of water as defined in claim 24 and further comprising the step of:
tensioning the pipeline by tensioning means on board the floating vessel to assist the plurality of articulated buoyancy chambers in supporting the pipeline in a span between the floating vessel and the bed of a body of water.

26. A method for laying an elongate pipeline upon the bed of a body of water comprising the steps of:
paying out the pipeline from a vessel floating upon the surface of the body of water, into the body of water and onto the bed of the body of water;
flooding the interior of the pipeline;
buoyantly supporting the pipeline from within the interior thereof in a span between the floating vessel and the bed of the body of water with a unitary elongate cylindrical buoyancy chamber positioned within the interior of the pipeline; and
maintaining the unitary elongate cylindrical buoyancy chamber at approximately a constant relative elevational level within the pipeline as the pipeline is progressively laid onto the bed of the body of water.

27. A method for laying an elongate pipeline upon the bed of a body of water as defined in claim 26 and further comprising the step of:
tensioning the pipeline by tensioning means on board the floating vessel to assist the elongate cylindrical buoyancy chamber in supporting the pipeline in a span between the floating vessel and the bed of the body of water.

28. A method for laying an elongate pipeline upon the bed of a body of water as defined in claim 27 and further comprising the steps of:
recovering the elongate cylindrical buoyancy chamber from within the interior of the pipeline upon completion of the pipelaying operation by:
lowering the free end of the pipeline onto the bed of the body of water,
flooding the elongate cylindrical buoyancy chamber,
pulling the elongate cylindrical buoyancy chamber out of the free end of the pipeline, and
blowing the elongate cylindrical buoyancy chamber to buoyantly raise the chamber to the surface of the body of water.

29. A method for laying an elongate pipeline upon the bed of a body of water as defined in claim 26 wherein the step of retaining compries:
connecting an elongate weight onto the lower end of the elongate cylindrical buoyancy chamber to retain the elongate cylindrical buoyancy chamber within the interior of the pipeline.

30. A method for laying an elongate pipeline upon the bed of a body of water as defined in claim 26 wherein said step of retaining comprises:
flooding a ballast compartment formed within the elongate cylindrical buoyancy chamber to ballast a portion of the elongate cylindrical buoyancy chamber.

31. A method for laying an elongate pipeline upon the bed of a body of water as defined in claim 26 wherein said step of retaining comprises:
establishing frictional contact between a friction means connected to a portion of said elongate cylindrical buoyancy chamber and the interior surface of the elongate pipeline.

32. A method for laying an elongate pipeline upon the bed of a body of water from a fixed station comprising the steps of:
suspending a pipeline to be laid upon the water bed between the fixed station and a floating vessel;
flooding the interior of the pipeline;
positioning an elongate buoyancy means within the interior of the pipeline for buoyantly supporting the pipeline span between the floating vessel and the bed of the body of water during the pipelaying operation;
retaining the elongate buoyancy means within the interior of the pipeline with retaining means extending from the elongate buoyancy means back through the pipeline to the fixed staion;
progressively laying the pipeline upon the bed of the body of water by,
making up the pipeline on board the floating vessel, and
paying the made up pipeline off the floating vessel into the body of water; while simultaneously
paying out the retaining means from the fixed station as the pipeline is laid to permit the buoyant elongate means to axially translate within the interior of the pipeline and thus remain at approximately a constant relative elevational level within the pipeline as the pipeline is progressively laid;

removing the elongate buoyancy means from within the interior of the pipeline upon completion of the pipelaying operation by,
  connecting a line to the free end of the elongate buoyancy means,
  flooding the elongate buoyancy means to remove the buoyancy thereof,
  lowering the free end of the pipeline onto the bed of the body of water,
  pulling the elongate means out of the free end of the pipeline,
  disconnecting the retaining means from the elongate means, and
  blowing the elongate means to buoyantly raise the elongate means to the surface of the body of water.

33. A method for laying an elongate pipeline upon the bed of a body of water comprising the steps of:
  paying out the pipeline from a vessel floating upon the surface of the body of water, into the body of water and onto the bed of the body of water;
  flooding the interior of the pipeline;
  buoyantly supporting the pipeline from within the interior thereof in a span between the floating vessel and the bed of the body of water with a plurality of regularly spaced, equal mass, articulated buoyancy chambers positioned within the interior of the pipeline;
  maintaining the plurality of buoyancy chambers at approximately a constant relative elevational level within the pipeline as the pipeline is progressively laid onto the bed of the body of water;
  recovering the plurality of buoyancy chambers from within the interior of the pipeline upon completion of the pipelaying operation, by
    lowering the free end of the pipeline onto the water bed,
    flooding the plurality of buoyancy chambers,
    pulling the plurality of buoyancy chambers out of the free end of the pipeline, and
    blowing the plurality of buoyancy chambers to buoyantly raise the buoyancy chambers to the surface of the body of water.

* * * * *